United States Patent
Shen

(10) Patent No.: US 11,816,585 B2
(45) Date of Patent: Nov. 14, 2023

(54) MACHINE LEARNING MODELS OPERATING AT DIFFERENT FREQUENCIES FOR AUTONOMOUS VEHICLES

(71) Applicant: Tesla, Inc., Austin, TX (US)

(72) Inventor: Anting Shen, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 739 days.

(21) Appl. No.: 16/701,669

(22) Filed: Dec. 3, 2019

(65) Prior Publication Data

US 2020/0175401 A1 Jun. 4, 2020

Related U.S. Application Data

(60) Provisional application No. 62/774,793, filed on Dec. 3, 2018.

(51) Int. Cl.
G06N 20/10 (2019.01)
G06N 20/00 (2019.01)
G06N 5/04 (2023.01)

(52) U.S. Cl.
CPC ............. *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS

| | | |
|---|---|---|
| 6,882,755 B2 | 5/2005 | Silverstein et al. |
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |

(Continued)

FOREIGN PATENT DOCUMENTS

| | | |
|---|---|---|
| AU | 2019261735 A1 | 6/2020 |
| AU | 2019201716 A1 | 10/2020 |

(Continued)

*Primary Examiner* — Hsiungfei Peng

(74) *Attorney, Agent, or Firm* — Knobbe, Martens, Olson & Bear, LLP

(57) ABSTRACT

Systems and methods include machine learning models operating at different frequencies. An example method includes obtaining images at a threshold frequency from one or more image sensors positioned about a vehicle. Location information associated with objects classified in the images is determined based on the images. The images are analyzed via a first machine learning model at the threshold frequency. For a subset of the images, the first machine learning model uses output information from a second machine learning model, the second machine learning model being performed at less than the threshold frequency.

18 Claims, 4 Drawing Sheets

(56) References Cited

U.S. PATENT DOCUMENTS

| | | |
|---|---|---|
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |

(56) References Cited

U.S. PATENT DOCUMENTS

| | | |
|---|---|---|
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al Shehri et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira et al. |
| 2016/0132786 A1 | 5/2016 | Balan et al. |
| 2016/0328856 A1 | 11/2016 | Mannino et al. |
| 2017/0011281 A1 | 1/2017 | Dihkman et al. |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147247 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |

(56) References Cited

U.S. PATENT DOCUMENTS

| | | |
|---|---|---|
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1* | 11/2019 | Lee ...................... G05D 1/0246 |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1* | 4/2020 | Hess .................... G06V 20/582 |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |

(56) References Cited

U.S. PATENT DOCUMENTS

| | | |
|---|---|---|
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al-Rfou et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | | |
|---|---|---|---|
| CN | 110599537 A | 12/2010 | |
| CN | 102737236 A | 10/2012 | |
| CN | 103366339 A | 10/2013 | |
| CN | 104835114 A | 8/2015 | |
| CN | 103236037 B | 5/2016 | |
| CN | 103500322 B | 8/2016 | |
| CN | 106419893 A | 2/2017 | |
| CN | 106504253 A | 3/2017 | |
| CN | 107031600 A | 8/2017 | |
| CN | 107169421 A | 9/2017 | |
| CN | 107507134 A | 12/2017 | |
| CN | 107885214 A | 4/2018 | |
| CN | 108122234 A | 6/2018 | |
| CN | 107133943 B | 7/2018 | |
| CN | 107368926 B | 7/2018 | |
| CN | 105318888 B | 8/2018 | |
| CN | 108491889 A | 9/2018 | |
| CN | 108647591 A | 10/2018 | |
| CN | 108710865 A | 10/2018 | |
| CN | 105550701 B | 11/2018 | |
| CN | 108764185 A | 11/2018 | |
| CN | 108845574 A | 11/2018 | |
| CN | 108898177 A | 11/2018 | |
| CN | 109086867 A | 12/2018 | |
| CN | 107103113 B | 1/2019 | |
| CN | 109215067 A | 1/2019 | |
| CN | 109359731 A | 2/2019 | |
| CN | 109389207 A | 2/2019 | |
| CN | 109389552 A | 2/2019 | |
| CN | 106779060 B | 3/2019 | |
| CN | 109579856 A | 4/2019 | |
| CN | 109615073 A | 4/2019 | |
| CN | 106156754 B | 5/2019 | |
| CN | 106598226 B | 5/2019 | |
| CN | 106650922 B | 5/2019 | |
| CN | 109791626 A | 5/2019 | |
| CN | 109901595 A | 6/2019 | |
| CN | 109902732 A | 6/2019 | |
| CN | 109934163 A | 6/2019 | |
| CN | 109948428 A | 6/2019 | |
| CN | 109949257 A | 6/2019 | |
| CN | 109951710 A | 6/2019 | |

(56) References Cited

FOREIGN PATENT DOCUMENTS

| | | |
|---|---|---|
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 261855981 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |

(56) References Cited

FOREIGN PATENT DOCUMENTS

| | | |
|---|---|---|
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

\* cited by examiner

MACHINE LEARNING MODELS OPERATING AT DIFFERENT FREQUENCIES FOR AUTONOMOUS VEHICLES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field of the Disclosure

This application relates generally to the machine vision field, and more specifically to enhanced object detection from a vehicle.

Description of the Related Art

In the field of machine vision for autonomous vehicles, automotive image sensors (e.g., cameras) are typically capable of high frame rates of 30 frames per second (fps) or more. However, deep learning based image processing algorithms may be unable to keep up with the high camera frame rates without significantly reducing accuracy, range, or both. Such algorithms may be run at 20 fps or less. This may result in a waste of the additional camera information available, which may thus be unused in image processing and object detection tasks.

Typically, slower machine learning models (e.g., object detectors) which run at slower frame rates than the cameras' frame rates, may have high accuracy, but long latencies, meaning that it can take longer for these slower machine learning models to produce an output. The output may therefore become stale by the time it's outputted. For example, a slower machine learning model detecting an image may take 200 milliseconds to do so. In the 200 milliseconds it takes for the machine learning model to output the detected image, the image has likely moved. To resolve this, a faster machine learning model may be employed. However, the faster machine learning model may be less accurate. As may be appreciated, less accuracy may result in a higher likelihood of false negatives and false positives. For automotive applications, for example, a false negative may represent vehicles in an image that the machine learning model fails to detect, while a false positive may represent a machine learning model predicting a vehicle in a location of the image when there is no vehicle present.

DETAILED DESCRIPTION

Figure 1:
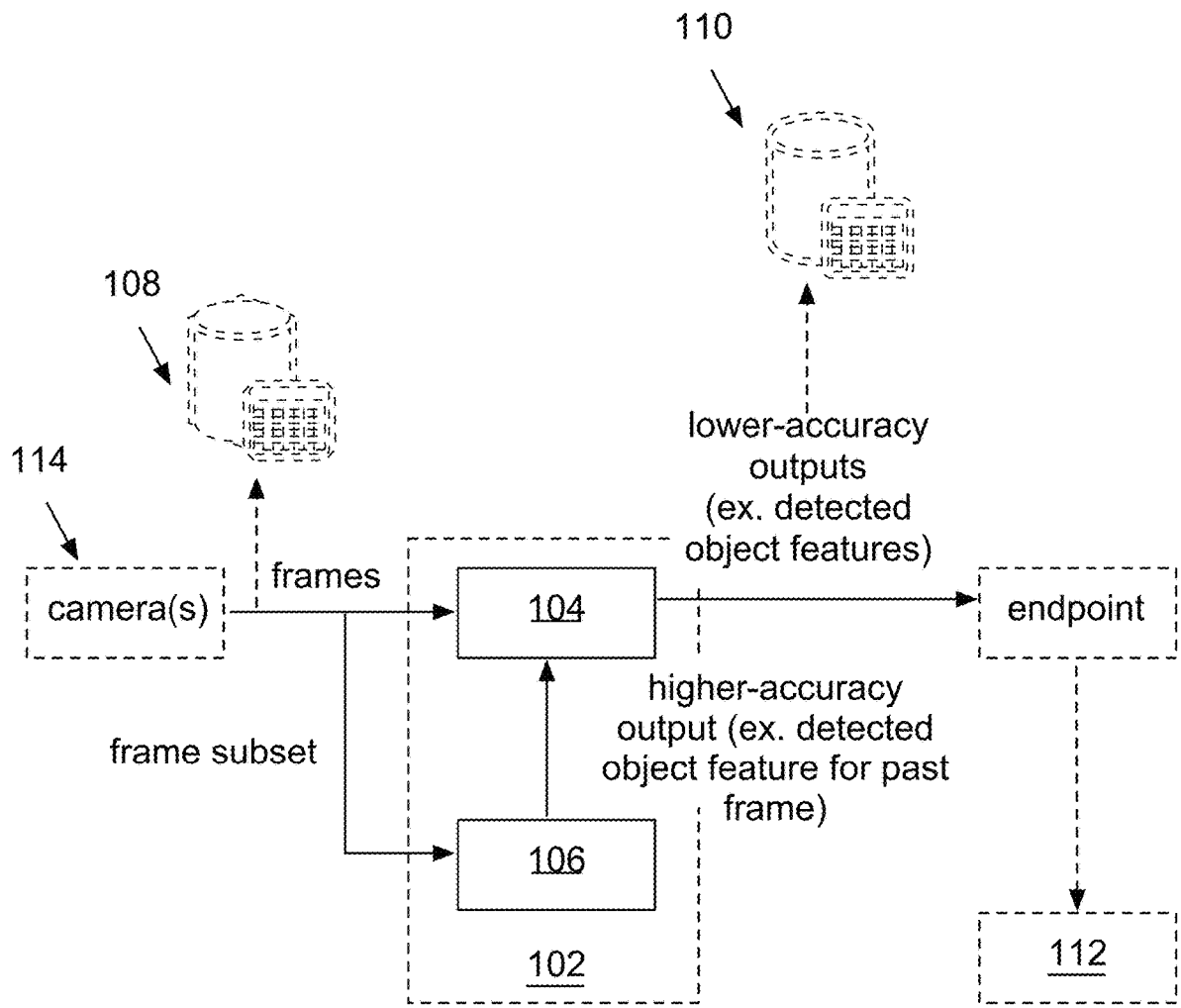
FIG. 1 is a schematic representation of an example object detection system according to one embodiment.

Although some embodiments described throughout generally relate to systems and methods for object detection, it will be appreciated by those skilled in the art that the systems and methods described can be implemented and/or adapted for a variety of purposes within the machine vision field, including but not limited to: semantic segmentation, depth estimation, three-dimensional bounding box detection, object re-identification, pose estimation, action classification, simulation environment generation, and sensor fusion.

Embodiments relate to techniques for autonomous driving or navigation by a vehicle. As described herein, one or more image sensors (e.g., cameras) may be positioned about a vehicle. For example, there may be 4, 6, 9, and so on, image sensors positioned at different locations on the vehicle. The image sensors may obtain images at one or more threshold frequencies, such as 30 frames per second, 60 frames per second, and so on. The obtained images may depict a real-world setting in which the vehicle is located. As an example, the real-world setting may include other vehicles, pedestrians, road hazards and the like located proximate to the vehicle. The vehicle may therefore leverage the captured images to ensure that the vehicle is safely driven. For example, the vehicle may generate alerts for viewing by a driver. In this example, an alert may indicate that a pedestrian is crossing a cross-walk. As another example, the vehicle may use the images to inform autonomous, or semi-autonomous, driving and/or navigation of the vehicle.

As described in more detail below, in some embodiments two or more machine learning models may be used to analyze images, or other sensor information, obtained from image sensors positioned about a vehicle. The machine learning models may be implemented via a system of one or more processors, application-specific integrated circuits (ASICs), and so on. In some embodiments, analyzing an image may include performing a forward pass of a deep learning network. The analysis may include classifying an object in an image and determining location information for the object. Location information may, as an example, indicate a bounding box within the image that depicts the object. Location information may also indicate pixels of the image which form the object.

A first machine learning model may analyze images at a first frequency. For example, the first machine learning model may be a "faster" model capable of analyzing all images obtained at the full image sensor frame rate (e.g., 30 frames per second, 60 frames per second, and so on). A second machine learning model may analyze images at a second, lower, frequency. For example, the second machine learning model may be a comparatively slower machine learning model capable of analyzing a subset of the obtained images (e.g., every $2^{nd}$ image, every $5^{th}$ image, and so on). Advantageously, the first machine learning model may periodically receive information from the second machine learning model to enhance an accuracy associated with analyzing images.

In some embodiments, the first machine learning model and the second machine learning model may be detectors. A detector, as an example, may be used to detect an object (e.g., classify an object, determine location information, and so on). With respect to the above, the first machine learning model may detect objects with an associated accuracy less than the second machine learning model. For example, the second machine learning model may be more computationally expensive (e.g., the model may have more convolutional networks, layers, and so on).

As will be described, in these embodiments the second machine learning model may therefore analyze the subset of images to accurately detect objects in the subset of images.

The first machine learning model may analyze all, or a substantial portion, of the images from the image sensors. Periodically, the first machine learning model may receive output information from the second machine learning model. This output information may be provided as an input, along with an image being analyzed, to the first machine learning model. The second machine learning model may provide supplemental information to the first machine learning model. In this way, an accuracy associated with detection of objects by the first machine learning model may be increased.

In some embodiments, the first machine learning model may be a tracker while the second machine learning model may be a detector. A tracker, as an example, may be used to track (e.g., estimate) a location of an object between images. For example, a tracker may track location information associated with a pedestrian. As will be described, the second machine learning model may be used to detect objects. The first machine learning model may estimate movement of the detected objects in images while the second machine learning model is processing a subsequent image. In some embodiments, the first machine learning mode may use additional sensor input, such as inertial measurement unit (IMG) information, global navigation satellite system (GNSS) information, and so on, to track locations of an object.

While machine learning models are described, such as deep learning models, it may be appreciated that classifiers, detectors, trackers, support vector machines, and so on, may be used and fall within the scope of the disclosure. Additionally, in some embodiments an output of the slower machine learning model may include detected objects. For example, classifications of the objects, location information, and so on, may be provided to the faster machine learning model. In some embodiments, an output of the slower machine learning model may represent feature maps, or other outputs associated with a convolutional network. This output may be provided to the faster machine learning model, which may be trained to periodically use such feature maps when detecting and/or tracking objects.

Overview

In one embodiment the method for object detection includes: receiving a first frame from a camera; processing the first frame with a first image processing engine receiving a second frame from the camera while the first frame is being processed; sending the processed output of the first frame to a second image processing engine with a faster processing speed that the first image processing engine; and combining the processed output of the first frame with the second frame to generate an object detection result for the first frame.

The method functions to provide an image processing system that combines multiple image processing engines to provide object detection outputs at a frame rate and accuracy much higher than either single image processing engine would achieve.

In one variation, combining the processed output of the first frame with the second frame is performed in order to allow the faster image processing engine to use the information from the slower image processing engine in order to make the information more accurate than it would have been with the faster image processing engine's output alone.

In one example, the method processes a high proportion of the images from a video stream output by a camera (e.g., all images, 90% of the images, etc.) with a fast, low accuracy detector. The slow detector generates a low-accuracy output for the detected objects (e.g., position, orientation, optical flow, motion vectors, other object features, etc.), preferably in substantially real-time (e.g., faster than the camera framerate), for subsequent use by a navigation system or other low-latency endpoint. The method concurrently processes a subset of the images from the same video stream with a slow, high accuracy detector, wherein the outputs of the slow detector (which lag behind the fast detector and the camera) are used as priors or input features for the fast detector. In one example, the fast detector can store the object features extracted from each image frame (or differences between image frames) that were sampled after a first image (that is being processed by the slow detector). Once the slow detector output is received by the fast detector, the fast detector can re-calculate the object features based on the more accurate object features output by the slow detector and the object parameter deltas to generate a higher-accuracy output (e.g., the fast detector's output is periodically recalibrated based on the slow detector's output). In a specific example, combining the low-accuracy outputs and the high-accuracy output can involve using the slower image processing engine's output combined with optical flow and motion vectors from the first image, moving the boxes by how much the car has moved in the second image, and then adjusting to generate the image prediction result for the second frame.

All or portions of the method can be performed at a predetermined frequency, performed upon occurrence of an execution event (e.g., upon an autonomous vehicle engaging in driving), or performed at any suitable time.

System

As shown in FIG. 1, one embodiment of an image processing system 100 can include: an image processing network 102, a first image processing engine 104, a second image processing engine 106, an image database 108, an output database 110, a client device or devices 112, and a camera or cameras 114. In some embodiments, processing the images includes one or more of image classification, object recognition, object detection, and object tracking.

In variants, the image processing network 102 functions to facilitate communication between various components of the system (e.g., between the image processing engines, between the image processing engines and the endpoint, etc.), but can additionally or alternatively perform any other suitable functionality. The image processing network can additionally or alternatively host or execute the other components of the system (e.g., the image processing engines). The image processing network can be: a scheduler, a set of processing systems (e.g., processors, ASICs, etc.), or be otherwise configured.

The first image processing engine 104 and second image processing engine 106 communicate with the image processing network 102 to process received images. In some embodiments, the first image processing engine 104 and second image processing engine 106 are components of the same computer device as the image processing network 102, while in other embodiments the first image processing engine 104, second image processing engine 106, and image processing network 102 are all components of separate computer devices. Any combination of components and computer devices may be contemplated.

In some embodiments, the image processing engines 104 and 106 may be deep learning image processing engines, non-deep learning image processing engines, or a combination of deep learning and non-deep learning image processing engines. In some embodiments, the image processing engines 104 and 106 may be detectors of varying image processing speeds, while in other embodiments the image processing engines 104 and 106 are a combination of a detector and a tracker, respectively. In some embodiments, the image processing engines 104 and 106 receives images in the form of a series of video frames from a camera. In some embodiments, the camera is an automotive camera placed within an autonomous vehicle for machine vision purposes, such as detecting objects on the road during the car's operation and predicting locations of objects in future frames based on the locations of the objects in current and past frames.

In some embodiments, the first image processing engine is capable of relatively "slow" image processing speeds, such as 20 fps or lower. In some embodiments, a slow detector may provide high accuracy and provide infrequent high accuracy output. In some embodiments, the first image processing engine is a detector selected from a predefined list of available detectors. In some embodiments, the detector may be chosen or selected with or without human input, according to such criteria as latency and accuracy requirements for a given image processing task.

In one variation, the first image processing engine is a high-accuracy or high-precision (e.g., higher than 50% mAP, 70% mAP, 80% mAP; etc.), high-latency (e.g., slower than 20 fps, slower than 30 fps, etc.) image processing engine. The first image processing engine is preferably an object detector (e.g., region-based convolutional network (R-CNN), fast R-CNN, region-based fully convolutional network (R-FCN), a detector using selective search, exhaustive search, deep learning, etc.), but can alternatively or additionally be: an object recognition algorithm, an object classifier, or any other suitable image processing engine. The second image processing engine can be a low-accuracy or low precision (e.g., lower than 60% mAP, 50% mAP, 40%, mAP; etc.), low-latency (e.g., faster than 30 fps, faster than 10 fps, etc.) image processing engine. The second image processing engine can be an object detector, classifier, or recognition algorithm (e.g., you only look once (YOLO), fast YOLO, YOLOv2, etc.), an object tracker (e.g., optical flow, point tracking, kernel tracking, silhouette tracking, etc.), or be any other suitable processor.

In one variation, the system includes a combination of two deep learning based detectors, one capable of outputting image prediction results at a relatively faster frame rate per second (fps) than the other. In another variation, the system includes a combination of a deep learning based detector (e.g., the slow detector) and a non-deep learning based tracker (e.g., the slow detector). A tracker follows one or multiple objects of interest within a scene or set of images to continuously provide their position. A tracker may estimate parameters of the dynamic system, including feature point positions and object position, using video from one or more cameras as the source of information. Detectors find objects of interest and provide their positions within an image. There is no assumption of system dynamics, nor is the response based on temporal consistency. Detectors use a single image, such as a single frame from a camera, as the source of information.

In some embodiments, the first and second image processing engines can perform tasks related to semantic segmentation. For example, the methods herein can be performed using semantic segmentation to calculate drivable area. In some embodiments, the first and second image processing engines perform tasks related to three-dimensional objects. For example, detecting boxes in three dimensions, segmentation in three dimensions, and predicting the three-dimensional orientation of objects can be performed using the methods herein.

Frame database 108 stores the frames from the camera into a database as they are outputted from the camera and sent to the image processing system 100. Output database 110 stores the output from the first image processing engine 104 and second image processing engine 106 based on the received images. In some embodiments, the output includes image prediction results, e.g., predictions of the future locations of objects in the images.

Client device(s) 112 are devices that send information to the image processing network 102, receive information from the image processing network 102, or both. A client device may include, e.g., one or more components of an autonomous vehicle, or a computer device associated with one or more users, organizations, or other entities.

Camera(s) 114 are devices that record visual information in video and/or image form and generate outputs of them in "frames" that represent a series of images in sequence for a given moment in time. In some embodiments, the camera(s) are positioned on one or more autonomous vehicles, and output frames while the vehicle is in operation. In some embodiments, the camera(s) are configured to output frames at a speed of 30 fps or higher.

The system can optionally include one or more chipsets or processing hardware that functions to execute all or a portion of the method. The processing hardware is preferably collocated with the processing hardware executing the endpoint application (e.g., executing the navigation method), but can additionally or alternatively be located on-board the component using the system outputs (e.g., on-board a vehicle or a robot), located remote from the component, or be otherwise arranged. The processing hardware can include one or more: embedded systems, microcontrollers, microprocessors, ASICs, CPUs, GPUs, TPUs, or any other suitable processing system.

In some embodiments, all or part of the processing hardware is located in an autonomous vehicle or across multiple autonomous vehicles, or in a central system or cloud associated with an autonomous vehicle fleet or network. In some embodiments, all of part of the processing within the system is performed in parallel across multiple processing components. In some embodiments, all or part of the processing within the system is performed in series across multiple processing components. In some embodiments, all or part of the processing tasks, camera output frames or image data are cached or available locally or offline for processing. In some embodiments, the system is partly or fully located within a cloud network.

In variants where the processing hardware's computation resources are limited (e.g., microcontrollers, ASICS, etc.), the system can automatically cluster layers of the first and/or second image processing engines into blocks (e.g., in variants wherein the first and/or second image processing engines include neural networks), such that the image processing engines can be interrupted when more urgent functions need to be executed. For example, the layers of the first image processing engine or slow detector (e.g., a DNN) can be clustered into blocks that are: intermittently run when the second image processing engine or fast detector is not consuming the computing resources; or constantly run but interrupted (e.g., at a break between sequential blocks) when a new video frame needs to be processed by the second image processing engine or fast detector. The blocks are preferably even, but can alternatively be uneven. However, limited computing resources can be otherwise managed. In variants where the processing hardware has multiple cores or can support multiple threads, the first image processing engine and second image processing engine can be executed in parallel (e.g., on different cores or threads). However, the computing resources can be otherwise allocated to different image processing processes of the method.

Example Methods/Block Diagrams

Figure 2:
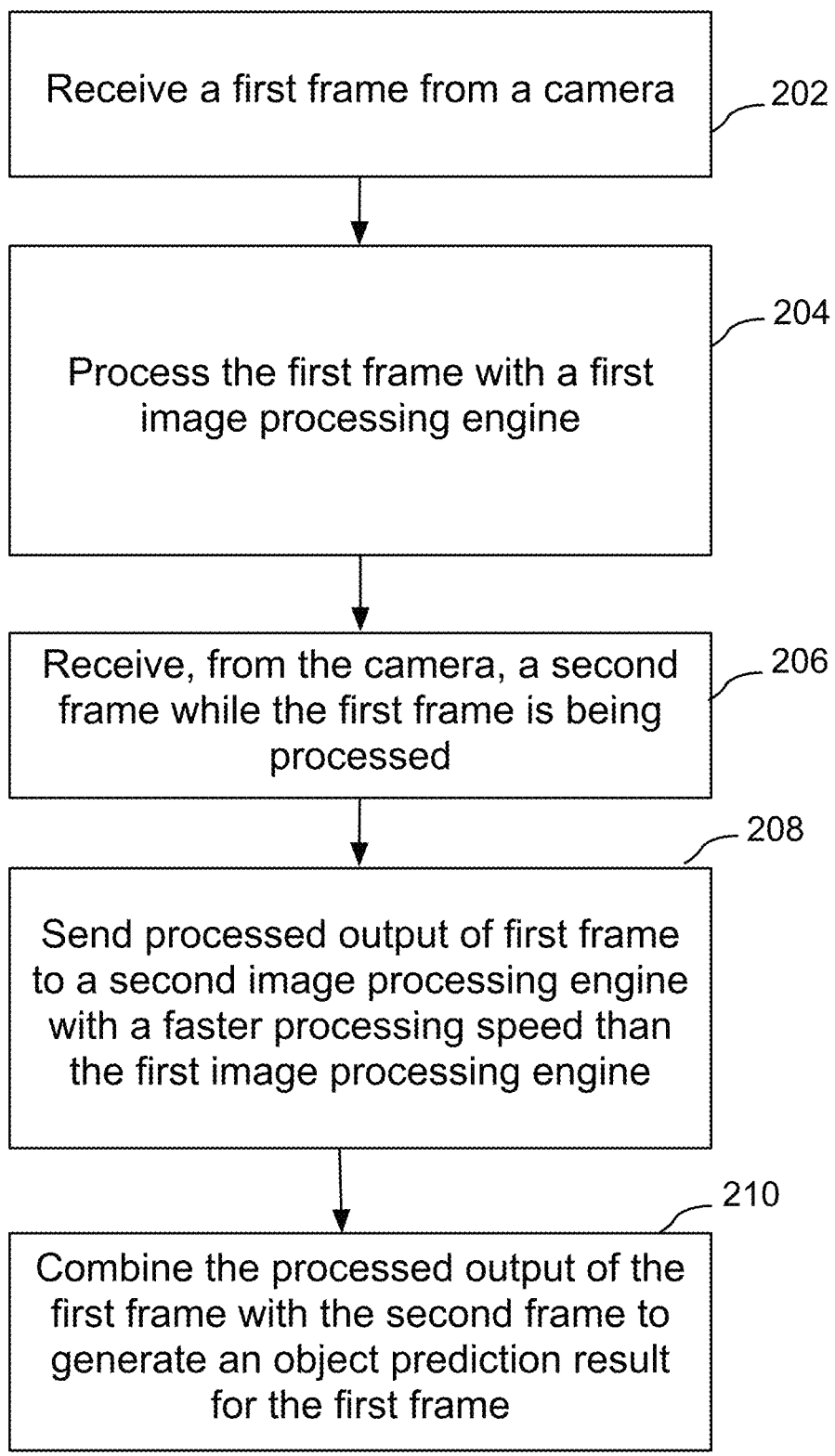
FIG. 2 is a flowchart of an example process for object detection according to one embodiment.

FIG. 2 is a flowchart representation of one embodiment of a method for detecting objects.

At step 202, system 100 receives a first frame from a camera. In some embodiments, the camera records video and outputs a first frame from the video, then sends it to system 100. In some embodiments, the camera takes a series of still images, and outputs a first frame representing a still image, then sends it to system 100. In some embodiments, system 100 stores the first frame in frame database 108.

At step 204, system 100 processes the first frame with a first image processing engine. In some embodiments, the first image processing engine is a detector capable of detecting objects within an image. In some embodiments, the first image processing engine is a tracker capable of tracking the locations of detected objects. In some embodiments, processing the first frame involves one or more of image classification, object detection, and object tracking. In some embodiments, the first image processing engine is a 'slow' detector, e.g., capable of generating image processing outputs at a speed of 20 fps or less. Slow detectors are typically highly accurate and provide infrequent high accuracy output. Slow detectors may be, for example, high compute, high resolution networks, or high compute, low resolution networks.

At step 206, system 100 receives a second frame from the camera while the first frame is being processed. In some embodiments, system 100 receives the second frame before the processing in step 204 is completed. In some embodiments, the second frame is the next frame in a series or sequence of frames the camera outputs in a video or other feed related to a sequence. The second frame is preferably processed by the second image processing engine (e.g., as discussed above, alternatively by any other suitable image processing engine) in real- or near-real time (e.g., substantially immediately, in 10% of the camera frame rate, etc.), but can be otherwise processed. In some embodiments, system 100 receives multiple frames in between the first frame and the second frame. The multiple frames can be used for image prediction, object detection, tracking, or other purposes within the image processing system 100.

At step 208, system 100 sends processed output of the first frame to a second image processing engine. In some embodiments, the second image processing engine has a faster processing speed than the first image processing engine. In some embodiments, the second image processing engine has a slower processing speed than the first image processing engine. In some embodiments, the first image processing engine may be a detector while the second is a tracker. In some embodiments, both the first and second image processing engines are detectors, with one capable of faster image processing speeds than the other. In some embodiments, the first image processing engine and the second image processing engine share the computational load within a single device or network of devices. In some embodiments, the first image processing engine is a deep learning based processor, while the second image processing engine is a non-deep learning based processor. In other embodiments, both processors are deep learning based processors. In some embodiments, the second image processing engine is a low compute, high resolution network. In some embodiments, the second image processing engine is a low compute, low resolution network. In some embodiments, the second image processing engine is a detector chosen from a predefined list of available detectors. In some embodiments, the detector may be chosen in such a way that the frame rate of the detector's output is equal to the camera's frame rate. In some embodiments, the frame rate of the detector's output is slightly faster than the camera's frame rate, with or without sharing the computational load of the first image processing engine. In some embodiments, the processed output includes results of the image processing of the first frame, such as detection of one or more images in the first frame, tracking of the locations of one or more images in the first frame, predicting the future locations of one or more images in the first frame, or other image processing results.

In some embodiments, the slow image processing engine does not receive every frame that is generated as output from the camera and sent to the system 100. In one variation, the slow image processing engine receives a frame from the camera (for processing) only when its processing and computational resources are not being expended on processing another frame. For example, if frame 1 is sent from the camera to the system 100 and the slow image processing engine has available resources that are not being used for processing a frame, then system 100 directs frame 1 to be sent to the slow image processing engine to be processed. When frame 2 is sent from the camera to the system 100 and the slow image processing engine is still using those resources to process frame 2, and insufficient resources remain to process frame 2, then system 100 does not direct frame 2 to be sent from the camera to the slow image processing engine. In a second variation, the slow image processing engine receives every Nth frame, wherein N can be selected based on: the camera sampling rate and the slow image processing engine's image processing rate (e.g., wherein sampling N frames can take longer than the time it takes for the slow processing engine to process a single frame), be predetermined, be determined based on the fast image processing engine's accuracy (e.g., wherein N can be smaller when the fast image processing engine is less accurate; larger when the fast image processing engine is more accurate; etc.), or be otherwise determined.

At step 210, system 100 combines the processed output of the first frame with the second frame to generate an object prediction result for the first frame. In some embodiments in which the first and second image processing engines are a detector and a tracker, system 100 combines the processed output of the first frame with the second frame by a method involving optical flow. Due to the tracker, the locations of objects from the first frame are known, and the image constituting the second frame has been received. In order to predict the locations of objects in the second frame, system 100 computes the optical flow between the two images of the first frame and second frame to obtain the motion vectors at each pixel. The motion vectors at each pixel provide information on how much each pixel has moved from the first frame to the second frame. System 100 averages the information on how much each pixel has moved to calculate how much the locations of objects have moved from the first frame to the second frame. System 100 then takes the boxes or boundaries of the objects in the first frame, and moves them by a certain amount to obtain a prediction of object locations in a future frame, such as a third or fourth frame. However, the processed output of the first frame and the second frame can be otherwise combined.

In some embodiments in which the first and second image processing engines are a slower detector and a faster detector, the faster detector can never predict new objects, it can only adjust the locations obtained by the slower detector for existing objects' locations. System 100 outputs the first frame's object's location after the second frame's object's location. This increases the accuracy compared to using only the output of the slower detector or the faster detector. No new objects will be detected until the slower detector has processed the frame and detected them. The faster detector will then make the locations of the objects more accurate, and can update the locations of the objects every frame. In this way, at every frame, the faster detector updates the locations of objects, and at every other frame, the slower detector looks for objects to detect. This leads to a more refined detection of the locations than methods including either using a fast detector that's comparatively less accurate on every frame, or using a slow detector with good detection of objects every other frame.

In some embodiments, the outputs of the first image processing engine, second image processing engine, or both are cached. If the image processing network 102 cannot run two neural networks at the same time, for example, then execution of the first image processing engine will have to be paused by system 100 while the second image processing engine runs. After the second image processing engine is finished running, system 100 will have to re-execute. In other embodiments, rather than caching the outputs of the image processing engines, system 100 executes the first and second image processing engine serially, or executes the first and second image processing engine in parallel.

Figure 3:
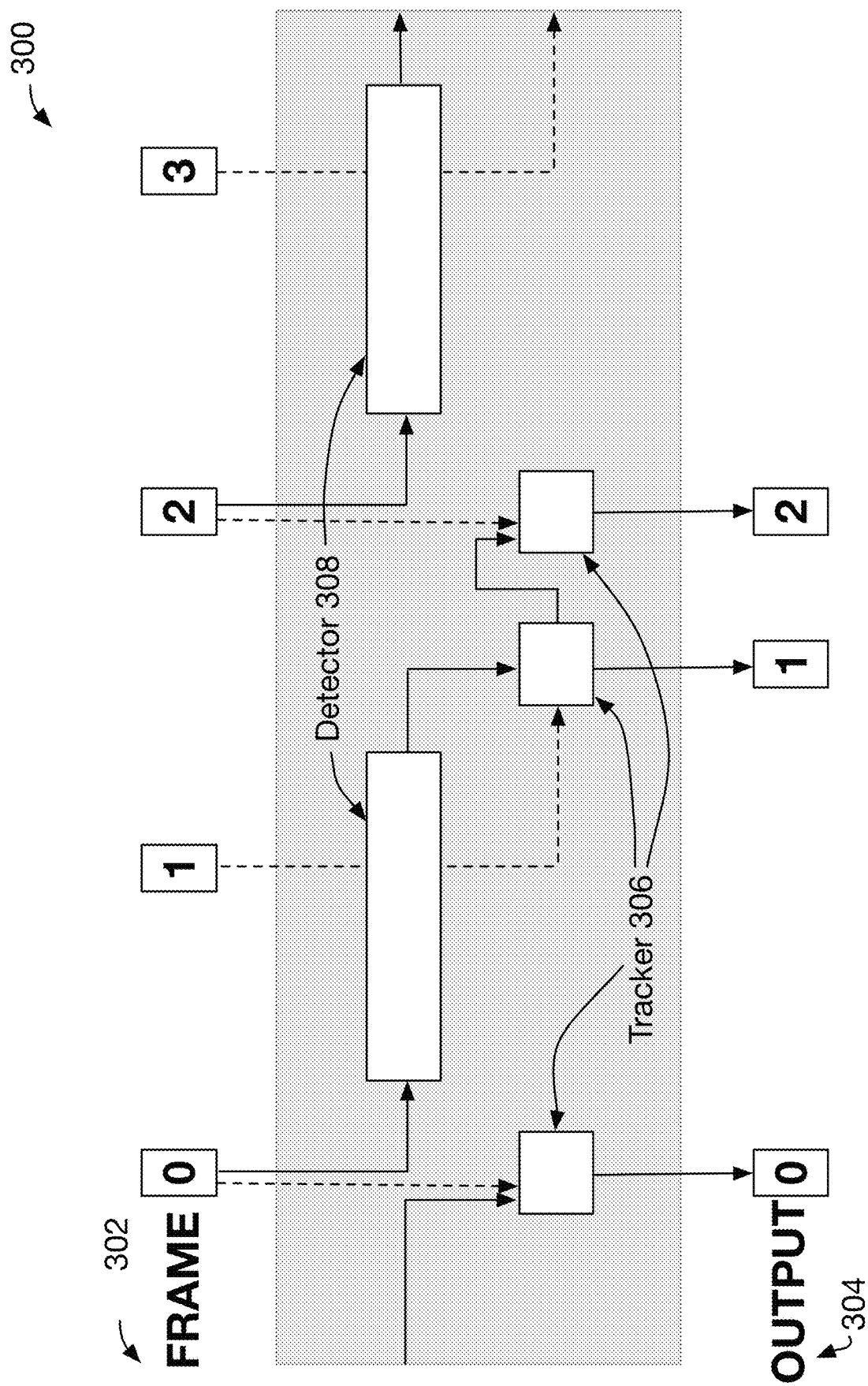
FIG. 3 is a block diagram illustrating an example of object detection using a detector and a tracker according to one embodiment.

FIG. 3 is an illustration of an example 300 of object detection using a detector and a tracker. Example 300 reads from left to right with frame 302 being outputted from a camera and received by system 100. Frame o, or the first frame, is received by system 100, and system 100 sends it to tracker 306. Tracker 306 in example 300 has a latency of 5 ms, which represents the latency time for the tracker 306 to produce an output after receiving a frame from the camera. System 100 also sends frame o to detector 308, which has a latency of 50 ms. Thus, detector 308 produces an output 50 ms after receiving a frame from the camera. The camera in example 300 produces output frames at 33 ms.

Tracker 306 receives frame o from the camera as an input, and, in some embodiments, receives an additional input constituting an output from detector 308. Tracker 306 processes the image of frame o by determining the object locations of identified objects within frame o, and produces an output 304 constituting output o for frame o.

Detector 308 receives frame o from the camera, and begins processing the image of frame o to identify objects within the frame as well as their locations. Detector 308 is slower than tracker 306, and thus the processing time takes longer. While detector 308 is processing frame o, frame 1, or the second frame, is received by system 100 from the camera. System 100 sends frame 1 to tracker 306.

Once detector 308 finishes processing frame o, detector 308 sends the output to system 100. System 100 sends the output of detector 308 processing frame o to tracker 306. At this point, tracker 306 has received the inputs of frame 1 from the camera and the output of frame o from the detector 308. Tracker 306 then takes in the identified objects and locations from frame o as determined by detector 308, and the image of frame 1 from the camera, and combines both of them into an output for frame 1. In some embodiments, the tracker 306 calculates the optical flow between the two images of frame o and frame 1 to get the motion vectors at each pixel. The motion vectors provide information of how much each pixel has moved. Tracker 306 averages the motion vectors for a particular object to determine how much that object has moved from frame o to frame 1 to generate bounding boxes. Tracker 306 then takes the bounding boxes from frame o and moves them by a set amount to predict image locations for frame 1. Tracker 306 then sends the output of that prediction as output 1.

In a similar fashion to the prior steps, frame 2 is received by system 100, which sends frame 2 to both tracker 306 and detector 308 as inputs. Tracker 306 receives frame 2 as an input, as well as the prediction result of frame 1 determined earlier. Tracker 306 then processes frame 2 and determines locations of identified objects within frame 2, then outputs that as output 2.

Detector 308 receives frame 2 as input, and begins processing frame 2 to identify objects and their locations within frame 2. While detector 308 is processing, frame 3 is received by system 100. System 100 sends frame 3 to tracker 306. When detector 308 is finished processing frame 2, the output is sent to tracker 306, which receives it as input. This processes continues for additional frames until the image processing task completes, the camera stops outputting frames and sending them to system 100, or some other triggering event occurs to stop the process.

The result of example 300 is that system 100 with tracker 306 and detector 308 produces outputs at 30 fps and 5-20 ms of latency, which is to be compared to 15 fps and 50 ms latency when a naive method of only the detector is used. Thus, superior speed is achieved, which allows for potentially better accuracy when compared to techniques such as shrinking a neural network down to the same speed.

Figure 4:
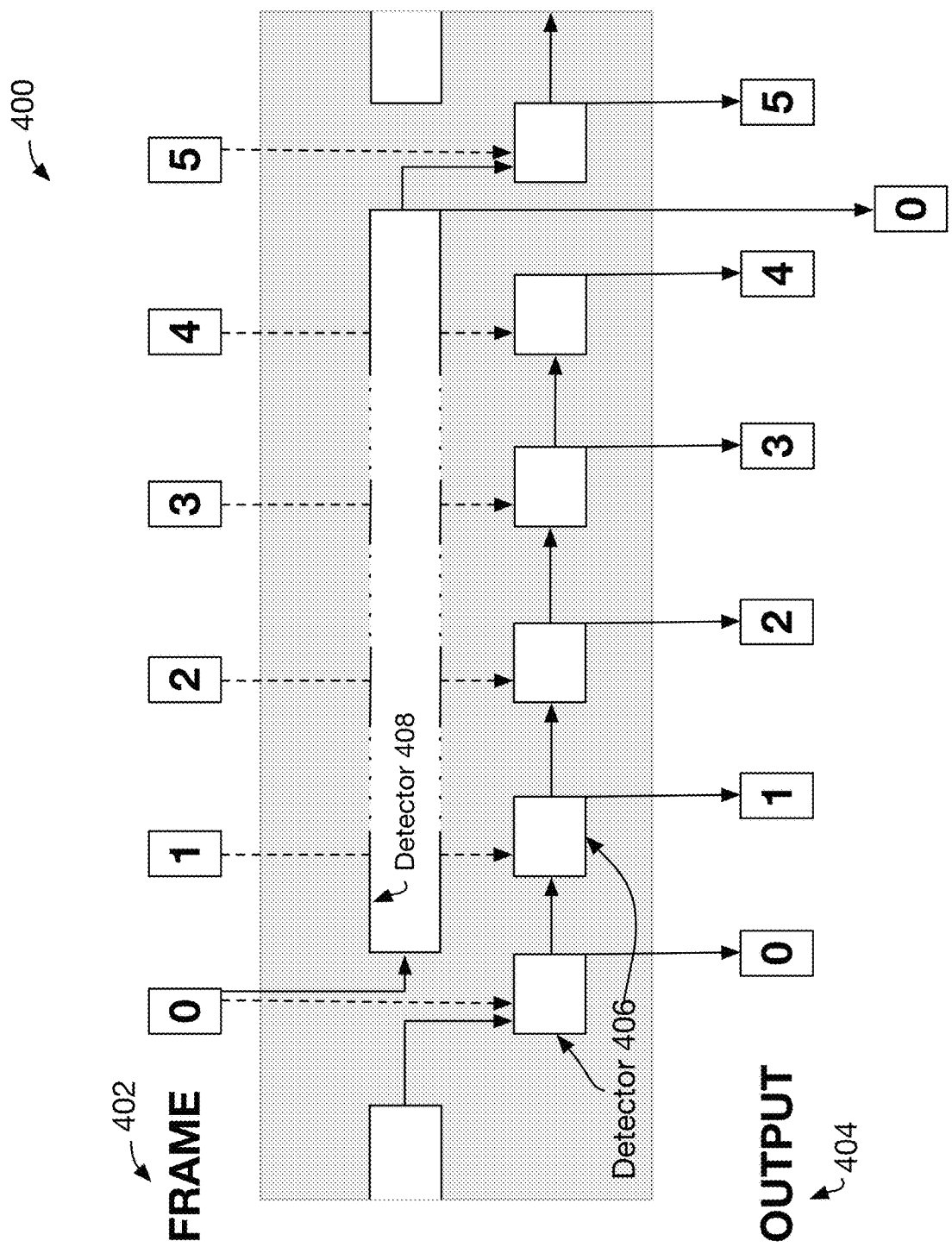
FIG. 4 is a block diagram illustrating an example of object detection using a first detector and a second detector according to one embodiment.

FIG. 4 is an illustration of an example 400 of object detection using a first detector and a second detector. Detector 408 in example 400 produces outputs at 80 ms latency, and is paired with faster detector 406, which produces outputs at 15 ms latency. The camera produces output frames at 33 ms. In some embodiments, both detector 406 and detector 408 are deep learning neural networks. In some embodiments, detector 408 employs a high compute, low resolution neural network, while detector 406 employs a low compute, low resolution neural network. In some embodiments, the faster detector 406 has the ability to use information from the previous frame.

Frames 402 are produced as outputs by the camera. Frame o is received by system 100, which sends it to the faster detector 406. In some embodiments, detector 406 also receives an additional input from detector 408. Detector 406 performs image processing tasks to produce an output 404, in this case output o. Detector 406 reuses the information obtained from the previous frame o, and also receives frame 1 as input. Detector 408 also receives frame o and begins processing. Detector 406 receives additional frames 2, 3, and 4, processes them, and outputs them as outputs 2, 3, and 4. Meanwhile, slower detector 408 continues processing frame o.

Once detector 408 finishes processing frame o, it sends the output o, which is a high accuracy prediction of identified objects and their locations, to faster detector 406. System 100 sends frame 5 from the camera to faster detector 406 as additional input. Detector 406 uses the high accuracy prediction from five frames ago, as outputted by detector 408, and updates it with the more recent frame 5 to generate more accurate predictions of object locations. In this sense, detector 406 is trained on the high accuracy prediction every fifth frame and trained on the previous low accuracy prediction every frame other than the fifth frame. In some embodiments, detector 406 uses machine learning techniques to learn using this previous data, including high accuracy predictions when they are available, and lower accuracy predictions otherwise. This leads to different weights being assigned to the neural network based on the different level of accuracy. Weights are the parameters of the neural network that constitute the output of the change in accuracy. This process repeats until the image processing task is completed, the camera stops outputting frames to system 100, or some other triggering event occurs.

In some embodiments of examples 300 and 400, both examples use a slower image processing engine as a prior input to a faster image processing engine in order to get an output at the speed of the faster image processing engine, but with information from the slower image processing engine with the aim of boosting accuracy beyond what the faster image processing engine can achieve by itself.

OTHER EMBODIMENTS

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the description without departing from the scope of this invention defined in the following claims.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by a system of one or more processors, the method comprising:
   obtaining a plurality of images at a threshold frequency, the images being obtained from one or more image sensors positioned about a vehicle;
   determining, based on the images, location information associated with objects classified in the images, wherein determining location information is based on analyzing the images via a first machine learning model at the threshold frequency,
      wherein a subset of the images is analyzed via a second machine learning model at less than the threshold frequency,
      wherein the first machine learning model is configured to periodically receive output information from the second machine learning model, the received output information being input into the first machine learning model in combination with a first image of the plurality of images, and the received output information being usable to increase an accuracy of determining location information associated with objects classified in the first image,
      wherein the plurality of images represents a sequence of images comprising at least the first image, and wherein prior to completion of the analysis by the second machine learning model, the first image is analyzed via the first machine learning model; and
   outputting the determined location information, wherein the determined location information is configured for use in autonomous driving of the vehicle.

2. The method of claim 1, wherein the first machine learning model is a tracker, and wherein the second machine learning model is a detector.

3. The method of claim 2, wherein determining location information comprises:
   instructing the second machine learning model to analyze the first image;
   prior to completion of the analysis by the second machine learning model, analyzing the first image via the first machine learning model, wherein the first machine learning model is configured to update location information associated with objects classified by the second machine learning model in an image prior to the first image in the sequence.

4. The method of claim 3, wherein the sequence of images further comprises a second image subsequent to the first image, and wherein the method further comprises:
   analyzing, via the second machine learning model, the first image of the plurality of images, wherein the second machine learning model determines output information comprising:
      one or more objects classified in the first image, and
      location information associated with the objects; and
   providing the determined output information to the first machine learning model as an input, wherein the first machine learning model analyzes the second image using the output information.

5. The method of claim 4, wherein for the second image, the first machine learning model determines updated location information associated with the one or more objects depicted in the first image.

6. The method of claim 2, wherein the second machine learning model classifies objects in the subset of the images, and wherein the first machine learning model updates, for each of the images, location information associated with the classified objects.

7. The method of claim 6, wherein the plurality of images represents a sequence of images, and wherein the first machine learning model determines optical flow information between images in the sequence of images.

8. The method of claim 1, wherein the first machine learning model is a first detector associated with a first accuracy, and wherein the second machine learning model is a second detector associated with a second, greater, accuracy.

9. The method of claim 8, wherein the sequence of images comprises at least the first image and one or more second images, and wherein determining location information comprises:
   instructing the second machine learning model to analyze the first image;
   prior to completion of the analysis by the second machine learning model, analyzing the first image and the one or more second images via the first machine learning model, wherein the first machine learning model is configured to determine location information associated with objects,
wherein the first machine learning model is configured to use output information from the second machine learning model, the output information being based on an image prior to the first image in the sequence.

10. The method of claim 9, wherein the sequence of images further comprises a third image subsequent to the first image and the one or more second images, and wherein the method further comprises:
analyzing, via the second machine learning model, the first image of the plurality of images, wherein the second machine learning model determines output information comprising:
one or more objects classified in the first image, and
location information associated with the objects; and
providing the determined output information to the first machine learning model as an input, wherein the first machine learning model analyzes the third image using the output information, such that an accuracy associated with the first machine learning model analyzing the third image is increased.

11. The method of claim 8, wherein the first machine learning model is trained based on periodically using output information from the second machine learning model as an input.

12. A system comprising one or more processors and non-transitory computer storage media storing instructions that, when executed by the one or more processors, cause the one or more processors to perform operations comprising:
obtaining a plurality of images at a threshold frequency, the images being obtained from one or more image sensors positioned about a vehicle;
determining, based on the images, location information associated with objects classified in the images, wherein determining location information is based on analyzing the images via a first machine learning model at the threshold frequency,
wherein, for a subset of the analyzed images, the first machine learning model is configured to use output information from a second machine learning model, the second machine learning model being configured to perform analyses on the subset of the analyzed images at less than the threshold frequency,
wherein the second machine learning model classifies objects in the subset of the images, wherein the first machine learning model updates location information associated with the objects based on each of the analyzed images,
wherein prior to completion of the classification by the second machine learning model, at least one image included in the subset is analyzed via the first machine learning model; and
outputting the determined location information, wherein the determined location information is configured for use in autonomous driving of the vehicle.

13. The system of claim 12, wherein the first machine learning model is configured to periodically receive output information from the second machine learning model, the received output information being usable to increase an accuracy associated with determining location information.

14. The system of claim 12, wherein the first machine learning model is a tracker, and wherein the second machine learning model is a detector.

15. The system of claim 12, wherein the first machine learning model is a first detector associated with a first accuracy, and wherein the second machine learning model is a second detector associated with a second, greater, accuracy.

16. Non-transitory computer storage media storing instructions that when executed by a system of one or more processors, cause the one or more processors to perform operations comprising:
obtaining a plurality of images at a threshold frequency, the images being obtained from one or more image sensors positioned about a vehicle;
determining, based on the images, location information associated with objects classified in the images, wherein determining location information is based on analyzing the images via a first machine learning model at the threshold frequency,
wherein, for a subset of the analyzed images, the first machine learning model is configured to use output information from a second machine learning model, the second machine learning model being configured to perform analyses on the subset of the analyzed images at less than the threshold frequency,
wherein the second machine learning model classifies objects in the subset of the images, wherein the first machine learning model updates location information associated with the objects based on each of the analyzed images,
wherein prior to completion of the classification by the second machine learning model, at least one image included in the subset is analyzed via the first machine learning model; and
outputting the determined location information, wherein the determined location information is configured for use in autonomous driving of the vehicle.

17. The computer-storage media of claim 16, wherein the first machine learning model is a tracker, and wherein the second machine learning model is a detector.

18. The computer-storage media of claim 16, wherein the first machine learning model is a first detector associated with a first accuracy, and wherein the second machine learning model is a second detector associated with a second, greater, accuracy.

* * * * *